(12) United States Patent
Ren et al.

(10) Patent No.: US 10,963,005 B1
(45) Date of Patent: Mar. 30, 2021

(54) MOUNTING BRACKET, DISPLAY SCREEN AND DISPLAY DEVICE

(71) Applicant: BOE Technology Group Co., Ltd., Beijing (CN)

(72) Inventors: Yan Ren, Beijing (CN); Lei Cao, Beijing (CN); Zifeng Wang, Beijing (CN); Junmin Sun, Beijing (CN); Jinggang Wei, Beijing (CN); Yunpeng Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/833,851

(22) Filed: Mar. 30, 2020

(30) Foreign Application Priority Data

Nov. 29, 2019 (CN) .......................... 201922121864.X (51) Int. Cl.
*G06F 1/16* (2006.01)
*F16M 11/04* (2006.01)
*A47F 5/08* (2006.01)

(52) U.S. Cl.
CPC .......... *G06F 1/1607* (2013.01); *A47F 5/0853* (2013.01); *F16M 11/045* (2013.01)

(58) Field of Classification Search
CPC combination set(s) only.
See application file for complete search history.

(56) References Cited

U.S. PATENT DOCUMENTS

| 7,708,233 | B2 * | 5/2010 | Tannas, Jr. | .......... B60R 11/0235 |
| | | | | 248/27.1 |
| 7,719,832 | B2 * | 5/2010 | Kobara | ..................... H04N 5/64 |
| | | | | 361/679.58 |
| 8,164,888 | B2 * | 4/2012 | Ma | ......................... G06F 1/1601 |
| | | | | 361/679.21 |
| 9,218,019 | B2 * | 12/2015 | Quijano | ..................... G06F 1/16 |
| 9,323,082 | B2 * | 4/2016 | Tannas, Jr. | ......... G02F 1/133308 |
| 10,126,787 | B1 * | 11/2018 | Aldridge | ................ G06F 1/181 |
| 10,492,316 | B2 * | 11/2019 | Sung | ..................... G06F 1/1607 |
| 10,606,110 | B2 * | 3/2020 | Ren | ........................ F16M 11/18 |
| 2016/0186925 | A1 * | 6/2016 | Bettin | ...................... A63B 1/00 |
| | | | | 248/542 |

* cited by examiner

*Primary Examiner* — Lisa Lea-Edmonds
(74) *Attorney, Agent, or Firm* — Westman, Champlin & Koehler, P.A.

(57) ABSTRACT

A mounting bracket and a display device are provided. The display screen is provided with a mounting portion protruding from a back surface of the display screen, and the mounting bracket is used for mounting a display screen, which includes a bracket body which is provided with an opening for mounting the mounting portion; the opening has a first side and a second side, the first side is provided with a first buckle, and the second side is provided with a second buckle; wherein the first side is adjacent to the second side.

14 Claims, 10 Drawing Sheets

MOUNTING BRACKET, DISPLAY SCREEN AND DISPLAY DEVICE

CROSS-REFERENCE TO RELATED APPLICATION

The present application claims the benefit of Chinese Patent Application No. 201922121864.X filed on Nov. 29, 2019 in the State Intellectual Property Office of China, the whole disclosure of which is incorporated herein by reference.

TECHNICAL FIELD

Embodiments of the present disclosure relates to a technical field of display devices, and in particular, to a mounting bracket, a display screen and a display device.

BACKGROUND

In the related art, fasteners such as screws and bolts are usually used to mount the display device in the wall. However, when a display device is mounted in a wall by using a fastener, a mounting hole of the fastener can be directly seen from the display device, which makes the appearance of the display device poor. When the display device needs to be detected, debugged or maintained, special tools are needed to remove the display device from the wall, which is inconvenient.

SUMMARY

According to an aspect of the present disclosure, there is provided a mounting bracket for mounting a display screen, wherein the display screen is provided with a mounting portion protruding from a back surface of the display screen, the mounting bracket comprises a bracket body which is provided with an opening for mounting the mounting portion; the opening has a first side and a second side, the first side is provided with a first buckle, and the second side is provided with a second buckle; wherein the first side is adjacent to the second side.

In some embodiments, an extension portion is provided at an end of at least one of the first buckle and the second buckle remote from the respective side of the opening, and the extension portion extends toward a display side of the display screen.

In some embodiments, the extension portion is in a shape of an arc.

In some embodiments, in a direction from a side of the opening to a center of the opening, the extension portion comprises a limiting portion and a first guiding portion provided in sequence, wherein a radian of the limiting portion is greater than a radian of the first guiding portion.

In some embodiments, the first side and the second side are perpendicular or approximately perpendicular to each other.

In some embodiments, the opening further comprises a mounting positioning side and the mounting portion is slidable along the mounting positioning side for installation and positioning.

In some embodiments, a shape of the opening is adapted to a shape of the mounting portion.

In some embodiments, a shape of the opening is rectangular.

According to another aspect of the present disclosure, there is provided a display screen, wherein the display screen is provided with a mounting portion protruding from a back surface of the display screen.

In some embodiments, a shape of the mounting portion is rectangular, and a side of the mounting portion is provided with a slot.

In some embodiments, a shape of the mounting portion is rectangular, and two adjacent sides of the mounting portion are respectively provided with a first slot and a second slot.

In some embodiments, a wedge-shaped second guiding portion is provided at a cutout of each of the first slot and second slot.

According to another aspect of the present disclosure, there is provided a display device, comprising a display screen and a mounting bracket; wherein, the display screen is provided with a mounting portion protruding from a back surface of the display screen;

the mounting bracket comprises a bracket body which is provided with an opening for mounting the mounting portion; the opening has a first side and a second side, the first side is provided with a first buckle, and the second side is provided with a second buckle; wherein the first side is adjacent to the second side.

In some embodiments, a first slot is provided on the mounting portion at a position corresponding to the first buckle, and the first buckle is fitted in the first slot; and a second slot is provided on the mounting portion at a position corresponding to the second buckle, and the second buckle is fitted in the second slot.

In some embodiments, a cutout of the first slot is provided with a wedge-shaped guiding portion for guiding the first buckle into the first slot, and a cutout of the second slot is provided with a wedge-shaped guiding portion for guiding the second buckle into the second slot.

In some embodiments, the display device further comprises a box in which a power module and a network module are provided, and the box is fixedly connected to the mounting bracket.

In some embodiments, the box and the mounting bracket are fixedly connected by a fastener.

In some embodiments, a first power interface and a first network interface are provided on the box, the first power interface is electrically connected to the power module, and the first network interface is electrically connected to an interface of an external network; and a second power interface and a second network interface are provided on the display screen, the second power interface is electrically connected to the first power interface, and the second network interface is electrically connected to the first network interface.

DETAILED DESCRIPTION OF EMBODIMENTS

In order to make the foregoing objectives, features, and advantages of the present disclosure more comprehensible, the present disclosure is described in further detail below with reference to the accompanying drawings and specific embodiments. An embodiment of the present disclosure provides a mounting bracket. The mounting bracket can be used to mount a display device such as a smart switch or a smart access control in a wall or a table. The embodiment of the present disclosure is only described by using an application scenario in which a smart switch is installed in a wall as an example, and other application scenarios can be implemented by reference.

Figure 1:
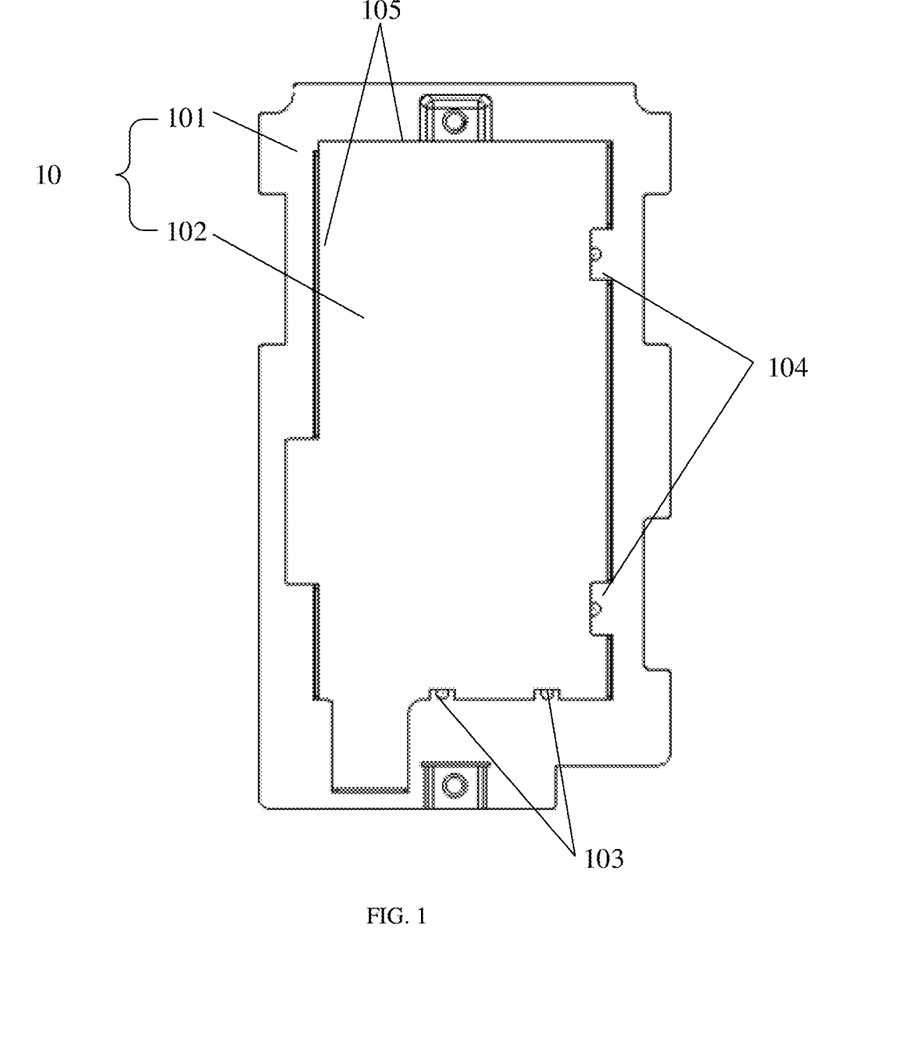
FIG. 1 is a schematic structural diagram of a mounting bracket according to the present disclosure.
Figure 2:
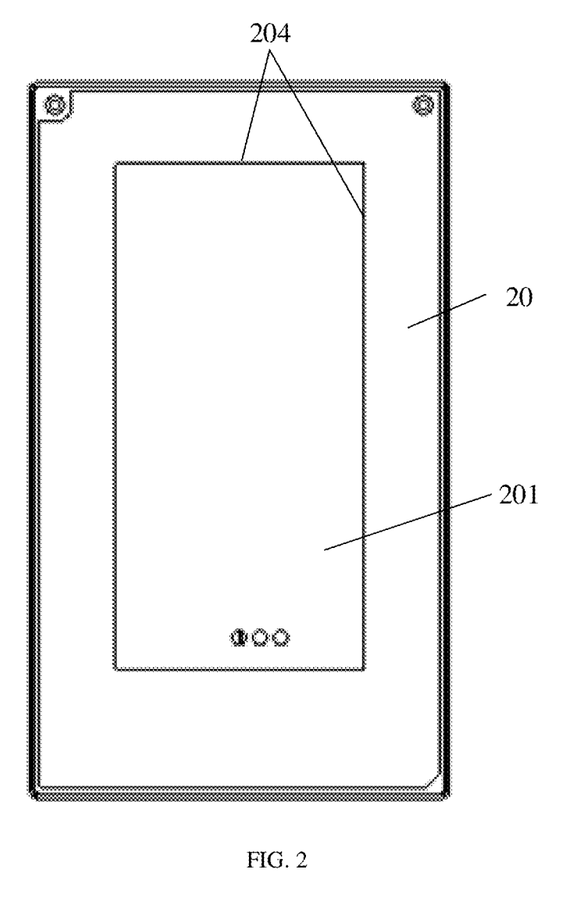
FIG. 2 is a schematic structural diagram of a display screen according to the present disclosure.

FIG. 1 is referred, which illustrates a schematic structural diagram of a mounting bracket according to the present disclosure, and FIG. 2 is referred, which illustrates a schematic structural diagram of a display screen according to the present disclosure. The mounting bracket 10 may be used for mounting the display screen 20, and a back surface of the display screen 20 is provided with a mounting portion 201 protruding out. The mounting bracket 10 may specifically include: a bracket body 101, which is provided with an opening 102 for mounting the mounting portion 201; a first side 110 of the opening 102 is provided with a first buckle 103, and a second side 120 of the opening 102 is provided with a second buckle 104; wherein the first side 110 is adjacent to the second side 120.

In the embodiment of the present disclosure, the bracket body 101 may be fixed in a wall. When the display screen 20 is mounted to the mounting bracket 10, the mounting portion 201 of the display screen 20 may be fitted in the opening 102, and the mounting portion 201 may be sequentially snapped to the first buckle 103 and the second buckle 104, thereby avoiding mounting the fasteners on the display screen 20 to adversely affect the appearance of the display screen 20. In addition, because the first side 110 and the second side 120 are adjacent to each other, and the first buckle 103 and the second buckle 104 can be engaged to the display screen 20 in two different directions, the connection between the mounting bracket 10 and the display screen 20 is more reliable. Moreover, when the display screen 20 needs to be detached from the mounting bracket 10, the display screen 20 can be taken out from the first buckle 103 and the second buckle 104 in two different directions, and no additional tool is needed, which facilitates the removal of the display screen 20.

Specifically, a first slot 202 may be provided on the mounting portion 201 of the display screen 20 at a position corresponding to the first buckler 103, and the first buckler 103 is fitted in the first slot 202; a second slot 203 may be provided on the mounting portion 201 of the display screen 20 at a position corresponding to the second buckle 104, and the second buckle 104 is fitted in the second slot 103 to achieve a fixed connection between the mounting bracket 10 and the display screen 20.

In practical applications, in order to facilitate the installation of the display screen 20 on the mounting bracket 10, the shape of the opening 102 on the mounting bracket 10 can be adapted to the shape of the mounting portion 201 of the display screen 20, for example, when the shape of the mounting portion 201 on the display screen 20 is rectangular, the shape of the opening 102 on the mounting bracket 10 may be rectangular correspondingly.

Optionally, the first side 110 and the second side 120 of the opening 102 may be perpendicular to each other, that is, the engaging directions of the first buckle 103 and the second buckle 104 may be perpendicular to each other. In practical applications, the other two sides of the opening 102 except for the first side 110 and the second side 120 may form first mounting positioning sides 105 for mounting the display screen 20 on a mounting bracket. When the display screen 20 is mounted on a mounting bracket 10, the first installation positioning side 105 can be used for installation and positioning of the display screen 20.

Accordingly, a second mounting positioning side 204 is provided on the mounting portion 201 at a position corresponding to the first mounting positioning side 105 on the mounting bracket 10. When the display screen 20 is mounted on the mounting bracket 10, the second mounting positioning side 204 can be used for installation and positioning of the display screen 20.

Figure 3:
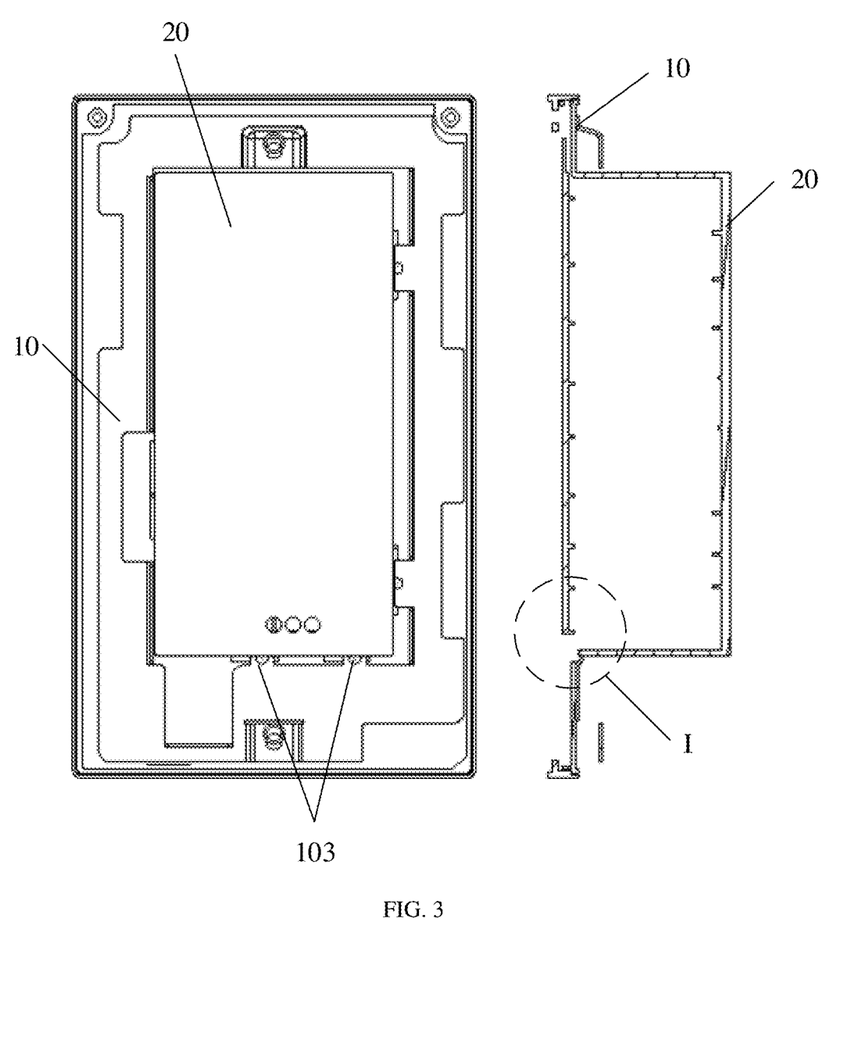
FIG. 3 is a first state diagram of a mounting bracket for mounting a display screen according to the present disclosure.
Figure 4:
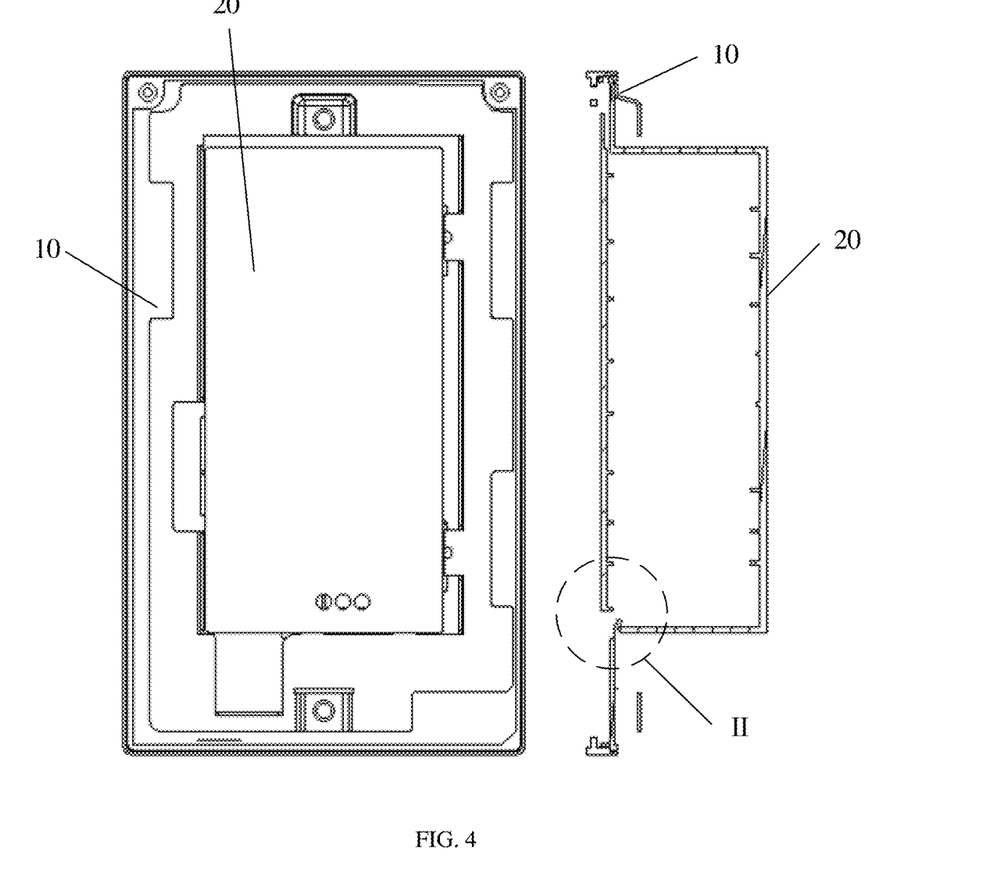
FIG. 4 is a second state diagram of a mounting bracket for mounting a display screen according to the present disclosure.
Figure 5:
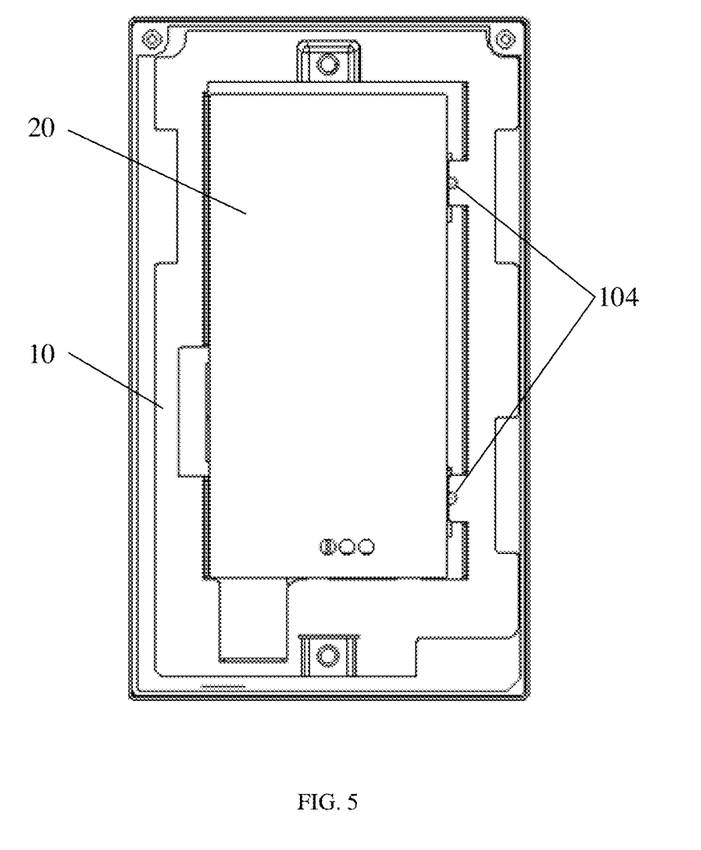
FIG. 5 is a third state diagram of a mounting bracket for mounting a display screen according to the present disclosure.
Figure 6:
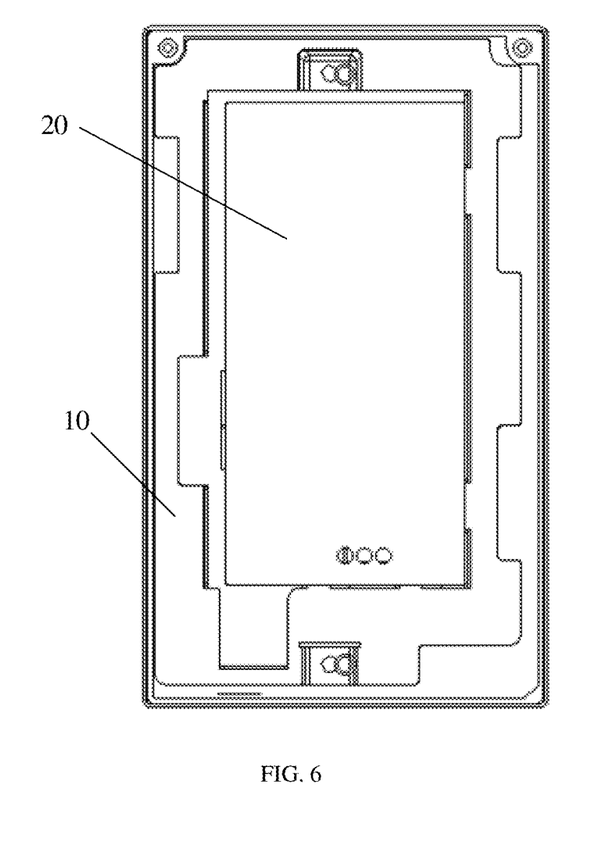
FIG. 6 is a fourth state diagram of a mounting bracket for mounting a display screen according to the present disclosure.

FIG. 3 is referred, which illustrates a first state diagram of a mounting bracket for mounting a display screen according to the present disclosure; FIG. 4 is referred, which illustrates a second state diagram of a mounting bracket for mounting a display screen according to the present disclosure; FIG. 5 is referred, which illustrates a third state diagram of a mounting bracket for mounting a display screen according to the present disclosure; FIG. 6 is referred, which illustrates a fourth state diagram of a mounting bracket for mounting a display screen according to the present disclosure.

In practical applications, when the display screen 20 is mounted on the mounting bracket 10, the mounting portion 201 of the display screen 20 may be first fitted in the opening 102, and the second mounting positioning side 204 on the display screen 20 may be fitted with the first mounting positioning side 105 on the mounting bracket 10 to realize the positioning of the display screen 20 on the opening 102 of the mounting bracket 10; then, the display screen 20 is further moved toward the first side 110 of the opening 102. The first state shown in FIG. 3 is switched to the second state shown in FIG. 4, and the first buckle 103 on the first side 110 may be snapped onto the mounting portion 201 of the display screen 20. Finally, the display screen 20 is pushed toward the second side 120 of the opening 102, and the third state shown in FIG. 5 is switched to the fourth state shown in FIG. 6, and the second buckle 104 on the second side may be snapped onto the mounting portion 201 of the display screen 20, thereby completing the installation of the display screen 20.

Specifically, since the first side 110 is perpendicular to the second side 120, the first buckle 103 and the second buckle 104 can be respectively engaged with the display screen 20 from the horizontal direction and the vertical direction, the connection between the mounting bracket 10 and the display screen 20 is relatively reliable. In addition, when the display screen 20 needs to be detached from the mounting bracket 10, the display screen 20 may be firstly moved in a direction away from the second side of the opening 202 to release the engagement between the mounting portion 201 and the second buckle 104, and then the display screen 20 is moved in a direction away from the first side of the opening 202 to release the engagement between the mounting portion 201 and the first buckle 103, and the display screen 20 can be removed from the mounting bracket 10. In this way, not only it does not require additional tools to facilitate the removal of the display screen 20, but also it is difficult for the user to remove the display screen 20 from the mounting bracket 10 without understanding the above-mentioned removal method, which is beneficial to prevent the incorrect operation of the user which causes the display screen 20 to fall off the mounting bracket 10.

Figure 7:
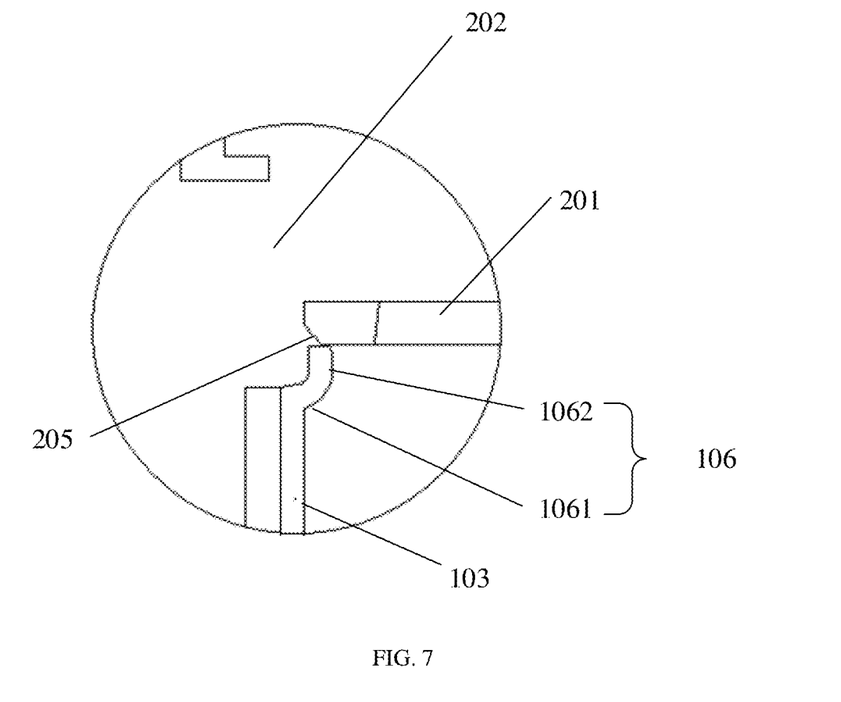
FIG. 7 is a detailed schematic diagram of the position I of the mounting bracket and the display screen shown in FIG. 3.
Figure 8:
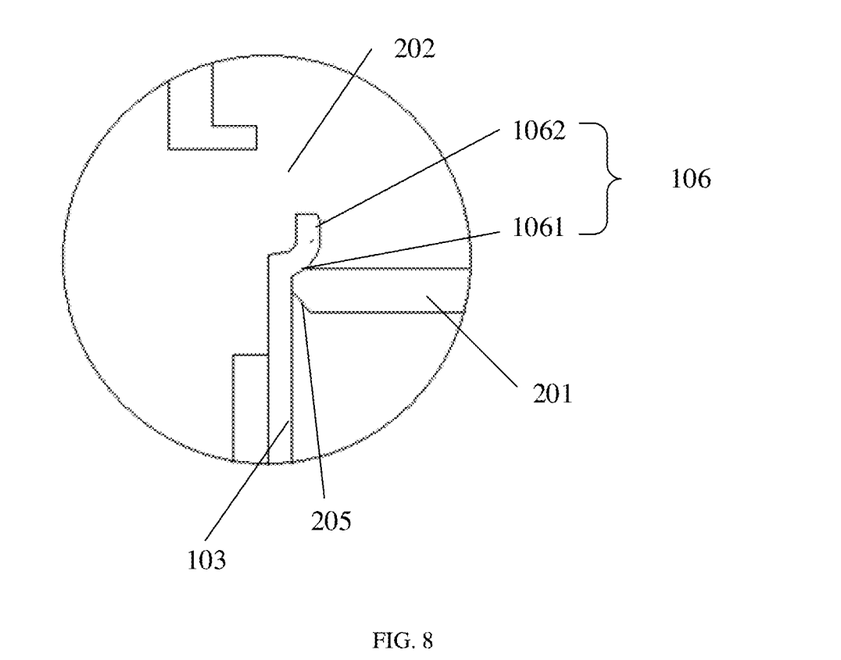
FIG. 8 is a detailed schematic diagram of the position II of the mounting bracket and the display screen shown in FIG. 4.

FIG. 7 is referred which illustrates a detailed schematic diagram of the position I of the mounting bracket and the display screen shown in FIG. 3; FIG. 8 is referred which illustrates a detailed schematic diagram of the position II of the mounting bracket and the display screen shown in FIG. 4. As shown in FIGS. 7 and 8, an extension portion 106 is provided on an end of the first buckle 103 remote from the side of the opening, and the extension portion 106 extends toward the display side of the display screen 20.

In practical applications, since the extension portion 106 extends toward the display side of the display screen 20, in a case where the first buckle 103 is fitted in the first slot 202 on the mounting portion 201, the extension portion 106 can abut against the mounting portion 201. In this way, while the first buckle 103 limits the display screen 20 from moving in the vertical direction shown in FIG. 3 and FIG. 4, it can also limit the display screen 20 from moving in a direction perpendicular to the paper in FIG. 3 and FIG. 4. In this way, the limiting effect of the first buckle 103 on the display screen 20 can be improved.

Optionally, the shape of the extension portion 106 is an arc shape. In practical applications, when the shape of the extension portion 106 is an arc shape, the extension portion 106 can be easily clicked into the first slot 202 of the display screen 20. Furthermore, it is possible to improve the smoothness of the first buckle 103 engaging in the first slot 202.

In an optional embodiment of the present disclosure, in a direction from the side to the center of the opening 202, the arc of the extension portion 106 may include two arc segments arranged sequentially, that is, a limiting portion 1061 and a first guiding portion 1062, the radian of the limiting portion 1061 is greater than the radian of the first guiding portion 1062.

As shown in FIG. 7, since the radian of the first guiding portion 1062 is smaller than the radian of the limiting portion 1061, it is convenient to snap the extension portion 106 into the first slot 202 of the display screen 20 in the process of the display screen 20 being mounted into the mounting bracket 10.

As shown in FIG. 8, after the display screen 20 is mounted in the mounting bracket 10, the extension portion 106 has been snapped into the first slot 202, and the mounting portion 201 of the display screen 20 abuts on the limiting portion 1061. The radian of the limiting portion 1061 is greater than the radian of the first guiding portion 1062. The radian of the limiting portion 1061 is large. The clamping force of the limiting portion 1061 on the mounting portion 201 is large, so the mounting portion 201 cannot easily slide out of the limiting portion 1061. In this way, the connection reliability between the display screen 20 and the mounting bracket 10 can be further improved.

Optionally, an extension portion 106 may be provided on the second buckle 104 on the mounting bracket 10, and the connection between the second buckle 104 and the second slot 203 on the display screen 20 may refer to the above example.

In practical applications, since the extension portion 106 on the second buckle 104 extends toward the display side of the display screen 20, in a case where the second buckle 104 is fitted in the second slot 203 on the mounting portion 201, the extension portion 106 can be abutted against the mounting portion 201. In this way, while the second buckle 104 limits the display screen 20 from moving in the horizontal direction in FIG. 3 and FIG. 4, it may further limit the display screen 20 from moving in a direction perpendicular to the paper in FIG. 3 and FIG. 4. In this way, the limiting effect of the second buckle 104 on the display screen 20 can be improved.

Figure 9:
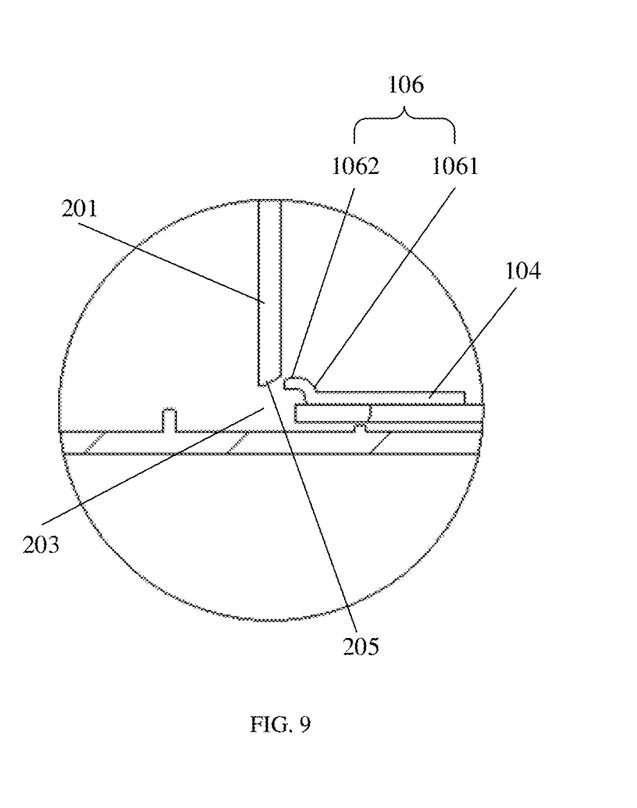
FIG. 9 is a first connection state diagram of a second buckle and a second slot according to the present disclosure.
Figure 10:
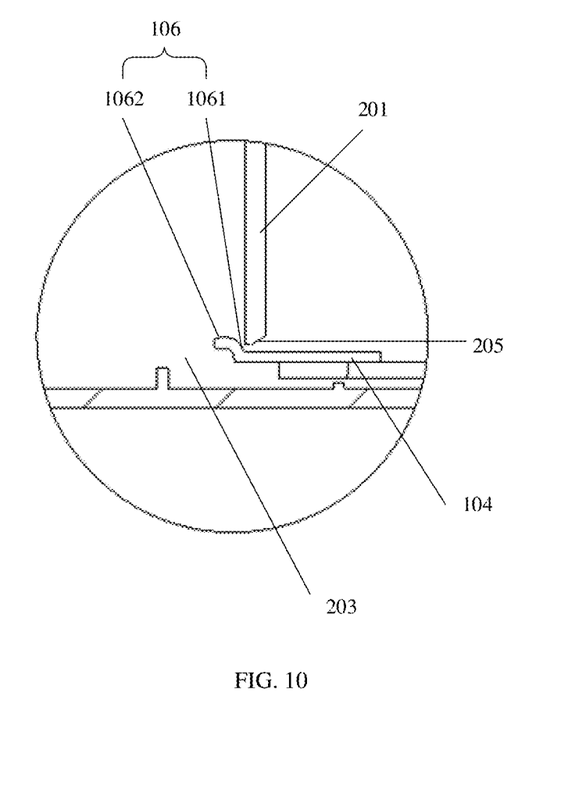
FIG. 10 is a second connection state diagram of a second buckle and a second slot according to the present disclosure.

FIG. 9 is referred, which illustrates a first connection state diagram of the second buckle and the second slot according to the present disclosure; FIG. 10 is referred, which illustrates a second connection state diagram of the second buckle and the second slot according to the present disclosure.

As shown in FIG. 9, since the radian of the first guiding portion 1062 is smaller than the radian of the limiting portion 1061, it is convenient to snap the extension portion 106 into the second slot 203 of the display screen 20 in the process of the display screen 20 being mounted into the mounting bracket 10.

As shown in FIG. 10, after the display screen 20 is mounted in the mounting bracket 10, the extension portion 106 has been snapped into the second slot 203. In addition, the mounting portion 201 of the display screen 20 abuts against the limiting portion 1061. The radian of the limiting portion 1061 is greater than the radian of the first guiding portion 1062. The radian of the limit portion 1061 is large. The clamping force of the limit portion 1061 to the mounting portion 201 is large. The mounting portion 201 cannot easily slide away from the limit portion 1061. In this way, the connection reliability between the display screen 20 and the mounting bracket 10 can be further improved.

It can be understood that, in a practical application, those skilled in the art may provide an extension portion 106 on the first buckle 103 and/or the second buckle 104 according to actual needs. In the embodiment of the present disclosure, the case where the extension portion 106 is provided on the first buckle 103 and the second buckle 104 is not specifically limited.

In addition, it should be noted that in FIG. 1 to FIG. 10, only the case where the mounting bracket 10 includes two first buckles 103 and two second buckles 104 is shown. In the practical applications, those skilled in the art can also set the numbers of the first buckle 103 and the second buckle 104 according to actual needs. For example, the number of each of the first buckle 103 and the second buckle 104 can be one, three, or four. The disclosed embodiment does not specifically limit the numbers of the first buckles 103 and the second buckles 104 on the mounting bracket 10.

In summary, the mounting bracket described in the embodiments of the present disclosure may include at least the following advantages.

In the embodiment of the present disclosure, the mounting bracket may include a bracket body, and an opening for mounting the mounting portion is provided on the bracket body; a first buckle is provided on a first side of the opening, and a second buckle is provided on the second side of the opening, the first side is adjacent to the second side. In practical applications, the bracket body may be fixed in a wall. When the display screen is mounted on the mounting bracket, a mounting portion of the display screen may be fitted in the opening, and the mounting portion can be snapped sequentially on the first buckle and the second buckle thereby avoiding mounting the fasteners on the display screen to adversely affect the appearance of the display screen. In addition, because the first side and the second side are adjacent to each other, and the first buckle and the second buckle can be connected to the display screen in two different directions, the connection between the mounting bracket and the display screen is more reliable. Moreover, when the display screen needs to be detached from the mounting bracket, the display screen can be taken out from the first buckle and the second buckle in two different directions, and no additional tool is needed, which facilitates the removal of the display screen.

Figure 11:
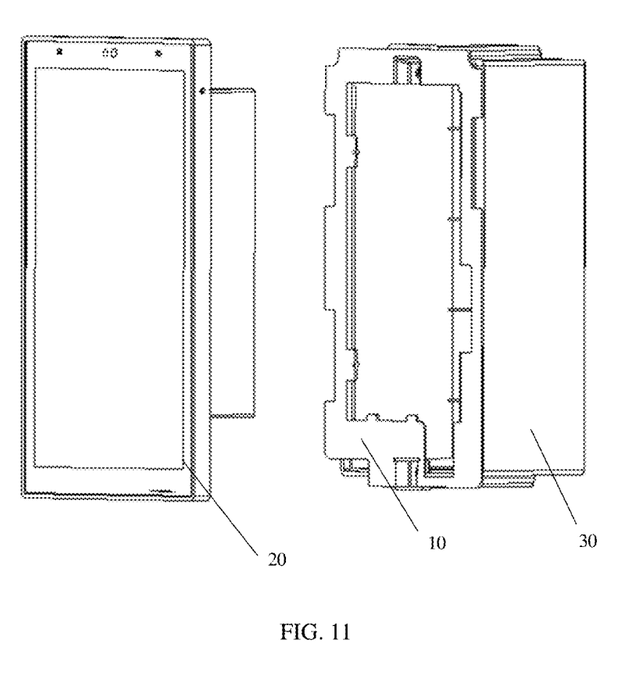
FIG. 11 is a schematic structural diagram of a display device according to the present disclosure.

FIG. 11 is referred, which illustrates a schematic structural diagram of a display device according to the present disclosure. The display device may specifically include a display screen 20 and a mounting bracket 10. The display screen 20 is provided with a mounting portion 201 protruding out; the mounting bracket 10 may include a bracket body 101. The bracket body 101 is provided with an opening 102 for mounting the mounting portion 201. A first buckle 103 is provided on a first side of the opening 102, and a second buckle 104 is provided on a second side of the opening 102. The first side is adjacent to the second side.

In practical applications, the bracket body 101 can be fixed in a wall. When the display screen 20 is mounted on the mounting bracket 10, the mounting portion 201 of the display screen 20 can be fitted in the opening 102, and the mounting portion 201 can be sequentially snapped on the first buckle 103 and the second buckle 104. Since the first side is adjacent to the second side, the first buckle 103 and the second buckle 104 can be engaged to the display screen 20 in two different directions. So the connection between the mounting bracket 10 and the display screen 20 is more reliable. Moreover, when the display screen 20 needs to be detached from the mounting bracket 10, the display screen 20 can be taken out from the first buckle 103 and the second buckle 104 in two different directions, and no additional tool is needed, which facilitates the removal of the display screen 20.

The mounting portion 201 of the display screen 20 may be provided with a first slot 202 at a position corresponding to the first buckle 103, and the first buckle 103 may be fitted in the first slot 202; the mounting portion 201 may be provided with a second slot 203 at a position corresponding to the second buckle 104, and the second buckle 104 may be fitted in the second slot 203 to achieve a fixed connection between the mounting bracket 10 and the display screen 20.

Optionally, the cutout of each of the first and second slots 202 and 203 is provided with a wedge-shaped second guiding portion 205, and the second guiding portion 205 may be used to guide the first buckle 103 into the first slot 202, and to guide the second buckle 104 into the second slot 203 so as to facilitate the display screen 20 to be mounted on the mounting bracket 10.

In the embodiment of the present disclosure, the display device may further include a box 30 provided with a power module and a network module therein. The box 30 is fixedly connected to the mounting bracket 10. In practical applications, the box 30 may be fixedly connected to the mounting bracket 10 and fitted in the wall together with the mounting bracket 10.

In practical applications, the box 30 and the mounting bracket 10 may be fixedly connected by fasteners to improve the connection reliability between the box 30 and the mounting bracket 10. Specifically, the fastener may include but is not limited to any one of a bolt, a screw, and a stud, and the specific type of the fastener may not be limited in the embodiments of the present disclosure.

In the embodiment of the present disclosure, the box 30 is provided with a first power interface and a first network interface, the first power interface is electrically connected to the power module, and the first network interface is electrically connected to the interface of the external network. The display screen 20 is provided with a second power interface and a second network interface, the second power interface is electrically connected to the first power interface, and the second network interface is electrically connected to the first network interface.

In practical applications, the second power interface on the display screen 20 is electrically connected to the first power interface on the box 30, and the second network interface on the display screen 20 is electrically connected with the first network interface on the box 30. With the electrical connections, the display screen 20 can be powered by using the power module in the box 30 and the network module in the box 30 can be used to provide network access for the user to perform related operations on the display screen 20.

In summary, the display device described in the embodiments of the present disclosure may include the following advantages.

In the embodiment of the present disclosure, when the display screen is mounted on the mounting bracket, a mounting portion of the display screen may be fitted in the opening, and the mounting portion can be snapped sequentially on the first buckle and the second buckle thereby avoiding mounting the fasteners on the display screen to adversely affect the appearance of the display screen. In addition, because the first side and the second side are adjacent to each other, and the first buckle and the second buckle can be engaged to the display screen in two different directions, the connection between the mounting bracket and the display screen is more reliable. Moreover, when the display screen needs to be detached from the mounting bracket, the display screen can be taken out from the first buckle and the second buckle in two different directions, and no additional tool is needed, which facilitates the removal of the display screen.

Finally, it should be noted that in this description, relational terms such as first and second are used only to distinguish one entity or operation from another entity or operation, and do not necessarily require or imply there is any such actual relationship or order between these entities or operations. Moreover, the terms "including", "comprising", or any other variation thereof are intended to encompass non-exclusive inclusion, such that a process, a method, an article, or a terminal device that includes a series of elements may include not only these elements but also those other elements that are not explicitly listed or elements inherent to the process, the method, the article, or the terminal device. Without more restrictions, the elements defined by the sentence "including one . . . " do not exclude that there are other identical elements in the process, the method, the article, or the terminal device including the elements.

The above describes a mounting bracket and a display device provided by the present disclosure in detail. The specific examples are used herein to explain the principles and implementation of the present disclosure. The descriptions of the above embodiments are only used to help understand the method and its core ideas according to the present disclosure. At the same time, for those skilled in the art, according to the ideas of the present disclosure, there will be changes in the specific implementation and application scope. In summary, the contents of this description should not be understood is a limitation on this disclosure.

What is claimed is:

1. A mounting bracket for mounting a display screen, wherein the display screen is provided with a mounting portion protruding from a back surface of the display screen, the mounting bracket comprises a bracket body which is provided with an opening for mounting the mounting portion; the opening has a first side and a second side, the first side is provided with a first buckle, and the second side is provided with a second buckle; wherein the first side is adjacent to the second side.

2. The mounting bracket according to claim 1, wherein an extension portion is provided at an end of at least one of the first buckle and the second buckle remote from the respective side of the opening, and the extension portion extends toward a display side of the display screen.

3. The mounting bracket according to claim 2, wherein the extension portion is in a shape of an arc.

4. The mounting bracket according to claim 3, wherein in a direction from a side of the opening to a center of the opening, the extension portion comprises a limiting portion and a first guiding portion provided in sequence, wherein a radian of the limiting portion is greater than a radian of the first guiding portion.

5. The mounting bracket according to claim 1, wherein the first side and the second side are perpendicular or approximately perpendicular to each other.

6. The mounting bracket according to claim 1, wherein the opening further comprises a mounting positioning side and the mounting portion is slidable along the mounting positioning side for installation and positioning.

7. The mounting bracket according to claim 1, wherein a shape of the opening is adapted to a shape of the mounting portion.

8. The mounting bracket according to claim 1, wherein a shape of the opening is rectangular.

9. A display device, comprising a display screen and a mounting bracket; wherein,
the display screen is provided with a mounting portion protruding from a back surface of the display screen;
the mounting bracket comprises a bracket body which is provided with an opening for mounting the mounting portion; the opening has a first side and a second side, the first side is provided with a first buckle, and the second side is provided with a second buckle; wherein the first side is adjacent to the second side.

10. The display device according to claim 9, wherein a first slot is provided on the mounting portion at a position corresponding to the first buckle, and the first buckle is fitted in the first slot; and
a second slot is provided on the mounting portion at a position corresponding to the second buckle, and the second buckle is fitted in the second slot.

11. The display device according to claim 10, wherein a cutout of the first slot is provided with a wedge-shaped guiding portion for guiding the first buckle into the first slot, and a cutout of the second slot is provided with a wedge-shaped guiding portion for guiding the second buckle into the second slot.

12. The display device according to claim 9, wherein the display device further comprises a box in which a power module and a network module are provided, and the box is fixedly connected to the mounting bracket.

13. The display device according to claim 12, wherein the box and the mounting bracket are fixedly connected by a fastener.

14. The display device according to claim 12, wherein a first power interface and a first network interface are provided on the box, the first power interface is electrically connected to the power module, and the first network interface is electrically connected to an interface of an external network; and
a second power interface and a second network interface are provided on the display screen, the second power interface is electrically connected to the first power interface, and the second network interface is electrically connected to the first network interface.

* * * * *